(12) United States Patent  
Norin

(10) Patent No.: US 6,173,155 B1  
(45) Date of Patent: Jan. 9, 2001

(54) METHOD AND APPARATUS FOR SPACECRAFT AMPLIFICATION OF MULTI-CHANNEL SIGNALS

(75) Inventor: John L. Norin, Los Angeles, CA (US)

(73) Assignee: Hughes Electronics Corporation, El Segundo, CA (US)

( * ) Notice: Under 35 U.S.C. 154(b), the term of this patent shall be extended for 0 days.

(21) Appl. No.: 09/160,601

(22) Filed: Sep. 25, 1998

Related U.S. Application Data

(60) Provisional application No. 60/062,005, filed on Oct. 17, 1997.

(51) Int. Cl.[7] .................... H03F 3/68; H04Q 7/20
(52) U.S. Cl. ............... 455/12.1; 455/115; 455/427; 455/428; 455/429; 455/69; 455/13.1; 375/296
(58) Field of Search ................ 455/12.1, 13.1, 455/427, 428, 429, 69, 115, 16, 19, 20, 22; 375/296

(56) References Cited

U.S. PATENT DOCUMENTS

| | | | |
|---|---|---|---|
| 4,907,004 | * 3/1990 | Zacharatos et al. | 342/373 |
| 5,638,024 | * 6/1997 | Dent et al. | 330/84 |
| 5,966,048 | * 10/1999 | Thompson | 330/124 R |
| 6,006,111 | * 12/1999 | Rowland | 455/561 |
| 6,061,568 | * 5/2000 | Dent | 455/450 |

\* cited by examiner

*Primary Examiner*—Daniel S. Hunter  
*Assistant Examiner*—Alan T. Gantt  
(74) *Attorney, Agent, or Firm*—Terje Gudmestad

(57) ABSTRACT

The number of high power amplifiers required for multi-channel satellite communications is reduced by a high power amplification of selected sets of signals in respective common amplifiers, with each set of combined signals consisting of channels whose frequency bands are mutually discrete and sufficiently separated in frequency that their third order intermodulation products do not substantially overlap in frequency with any of the channels in the same set. The signals can be separated out again after amplification and transmitted as downlink signals, either individually from a dedicated downlink antenna or in combination with other channels in a common downlink antenna.

46 Claims, 4 Drawing Sheets

METHOD AND APPARATUS FOR SPACECRAFT AMPLIFICATION OF MULTI-CHANNEL SIGNALS

This application is a regular application of Provisional Application Ser. No. 60/062,005, filed on Oct. 17, 1997.

BACKGROUND OF THE INVENTION

1. Field of the Invention

This invention relates to communications spacecraft, and more particularly to a low cost method and apparatus for satellite amplification of communication signals within different channels (satellite transponders) that are separate from each other in frequency.

2. Description of the Related Art

An increase in the RF power capability of high power satellite amplifiers along with an increase in the DC power capability of commercial satellites has led to the transmission of higher power satellite downlink beams for applications such as direct broadcast television. While this is very helpful when a large area is to be covered by a single beam and/or when the beam broadcast includes a large number of transponders, new applications are emerging in the satellite communications field that utilize smaller "spot" beams rather than large composite patterns. Such an application is described in a co-pending patent application by John L. Norin et al. filed on the same day as this application, Ser. No. 60/062,004. "Non-Uniform Multi-Beam Satellite Communications System and Method", in which direct local television service is provided through a non-uniform pattern of local spot beams.

The standard technique for transmitting multiple signal channels from a single satellite is to provide a separate high power amplifier dedicated to each channel. For example, 32 active amplifiers would be used for a frequency plan covering 32 channels. This works well for large coverage areas, or smaller coverage areas with high power requirements. However, when smaller and lower power spot beams are to be transmitted, this results in excess output power capacity and weight when amplifiers with standard power ratings are used, and the amplifiers will be required to operate at less than efficient levels. If an attempt is made to match the power rating of each amplifier with the signal power within its respective channel by providing a variety of different amplifier sizes, the result is an increase in cost (particularly if non-standard amplifier sizes are required) and a requirement for extra redundancy rings to protect from unit failures, all of which increase the satellite cost.

High power amplifiers typically weigh on the order of 5 kg each, so a requirement for 32 separate amplifiers adds significantly to the total payload weight. At present each amplifier costs on the order of $250,000 and adds roughly another $150,000 to launch costs. The direct and indirect costs of amplifiers for a satellite with 32 downlink channels can thus exceed $10,000,000.

A method used on occasion for channel amplification has been to route multiple channels that are adjacent in frequency through a single amplifier. This is used for low power applications, such as the input receiver of a payload, but is rarely useful for high power amplification due to the intermodulation distortion that results when the amplifier is operated near saturation. To reduce the intermodulation components to acceptable levels the amplifier may have to be operated closer to its linear region, resulting in reduced DC power consumption efficiency. Even if the possibility of intermodulation distortion is accepted along with a more expensive DC power consumption, the individual channels cannot be routed to different downlink antennas as is frequently desirable, particularly for a spot beam application.

SUMMARY OF THE INVENTION

The present invention seeks to provide a method and apparatus to more efficiently amplify multi-channel satellite signals while avoiding disruptive intermodulation distortion and achieving both lower costs and reduced payload weight.

These goals are accomplished by using one or more high power amplifiers to amplify respective sets of mutiple channel signals, with the signal powers for each channel summing to not more than that amplifier's power rating less the backoff amount required for multicarrier operations (typically 1.5 dB). (If intermodulation products of higher order than 3 are a concern in the frequency plan, a slight additional backoff may be desired.) The frequency bands of the channels selected for such amplifier are mutually discrete and are sufficiently separated that their third order intermodulation products do not substantially overlap in frequency with any of the other channels for the same amplifier.

The selected set of channel signals for each amplifier are combined prior to amplification, with the combined signal amplified by the common amplifier. The channels within each set are preferably separated from each other after common amplification, with the various channels broadcast either separately from individual antennas or in combination with other channels (which need not have been included in its input set) from the same downlink antenna. Different amplifiers can also be used for channels with different polarizations, and additional amplifiers can be dedicated to single channels with higher powers. The final result is a system that costs and weighs significantly less than one utilizing a separate amplifier for each channel.

These and other features and advantages of the invention will be apparent to those skilled in the art from the following detailed description, taken together with the accompanying drawings.

BRIEF DESCRIPTION OF THE DRAWINGS

FIGS. 3a and 3b are frequency diagrams illustrating various sets of two channels that can be amplified by a common amplifier in accordance with the invention;

FIGS. 3c and 3d are frequency diagrams illustrating sets of three channels for joint amplification;

FIGS. 3e and 3f are frequency diagrams illustrating sets of four channels for joint amplification.

DETAILED DESCRIPTION OF THE INVENTION

Figure 1:
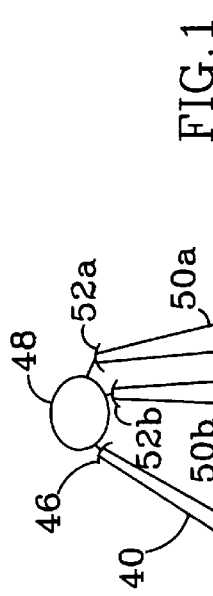
FIG. 1 is an illustration of an orbiting satellite with uplink and downlink communications.

FIG. 1 illustrates the primary application for the invention, which is the satellite broadcast of local service direct television programming, preferably together with larger regional broadcasts. However, the invention is not limited to television signals, and is applicable to spacecraft communications in general.

An uplink beam 40 is transmitted from a ground station 42 on the earth's surface 44 to an uplink antenna 46 on an orbiting satellite 48. The uplink signal will generally include numerous different channels (frequency bands). The satellite may also receive additional uplink beams on the same or additional uplink antennas. The uplink beams are processed by the satellite circuitry and transformed to a series of downlink signals, which are transmitted back to earth as broadcast beams 50a, 50b from respective downlink antennas 52a, 52b. More than one beam will normally be transmitted from each antenna, with the beam directionalities determined by the positions of the antenna feedhorns which are excited by each channel, relative to the antenna reflectors. Some of the beams can be smaller "spot" beams for local direct television service under the International Telecommunications Union Broadcast Satellite Service (BSS) category, while other beams can be for larger regional service areas under the Fixed Satellite Service (FSS) category. The type of feedhorn employed and the size of the antenna reflector determine the size of each beam.

As mentioned above, the amplification of multiple channels by a single amplifier has been limited to relatively low power applications, generally less than 50 Watts, because of cross-modulation distortion between the channels in commonly available amplifiers with less than 150 Watt capacity. The third order intermodulation products generally lead to the most severe distortion. Third order intermodulation products generated by two adjacent channels are illustrated in the frequency plot of FIG. 2a. For purposes of this application, successive channels that are adjacent to each other in frequency are identified by successive odd numbers; even numbers are used for channels within the same frequency band but with an opposite polarization. For illustration, a broadcast channel with a frequency band of 25.5 MHz is used, and is separated from the next adjacent channel by 3 MHz.

Figure 2A:
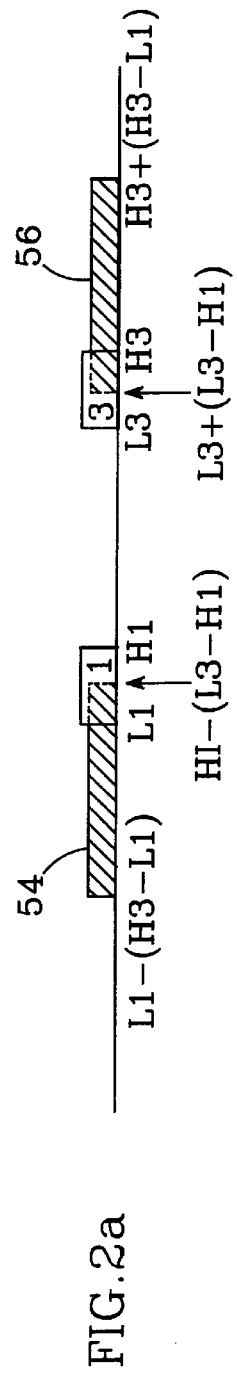
FIGS. 2a and 2b are frequency diagrams illustrating third order intermodulation products that result from jointly amplifying two channels that are close together (FIG. 2a) and wider apart (FIG. 2b) in frequency.

Adjacent channels 1 and 3 are illustrated in FIG. 2a, with channel 1 extending between a low frequency L1 and a high frequency H1, and channel 3 extending between a low frequency L3 and a high frequency H3. For this frequency scheme, it is known that the lower frequency third order intermodulation product 54 extends from a low frequency L1–(H3–L1) to a high frequency of H1–(L3–H1), while the higher frequency third order intermodulation product 56 extends from a low frequency L3+(L3–H1) to a high frequency of H3+(H3–L1). The third order intermodulation products overlap with each of the channels, and thus introduce a significant amount of distortion into the channel downlink broadcast.

In accordance with the invention, two or more lower power channels are amplified by a single common amplifier, thus reducing the total number of required amplifiers and yielding significant cost and weight savings, by a careful selection of the channels to be amplified in common. Their frequency bands are mutually discrete and sufficiently separated in frequency that their third order intermodulation products do not substantially overlap in frequency with any of the other channels to be amplified by the same amplifier. While third order intermodulation products are still generated, they are separated in frequency from the channels being amplified and can be filtered out, thus removing the most severe distortion components from the signals transmitted back to earth.

Figure 2B:
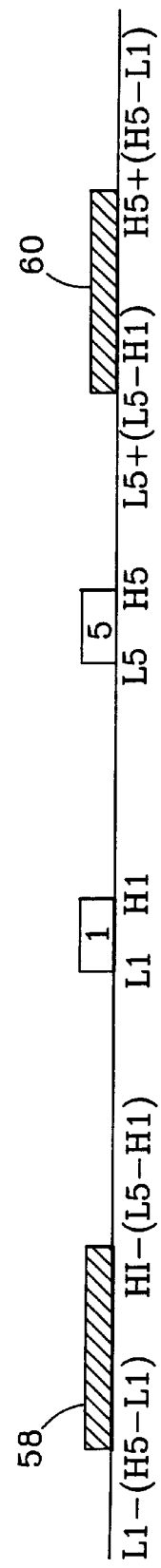

The frequency separation employed by the invention is illustrated in FIG. 2b, in which channels 1 and 5 are selected for common amplification. Since channels 1 and 5 are separated by channel 3, there is a frequency gap of 31.5 MHz (3+25.5+3) between them. The result is that the lower frequency third order intermodulation product 58, which extends from L1–(H5–L1) to H1–(L5–H1), is spaced in frequencies below channel 1; the higher frequency third order intermodulation product 60, which extends from L5+(L5–H1) to H5+(H5–L1), is similarly spaced in frequency above channel 5. This allows channels 1 and 5 to be amplified together and their third order intermodulation products filtered out before being broadcast from the satellite.

FIGS. 3a–3f are frequency plans which illustrate various channel combinations that can be realized for common high power amplification in accordance with the invention, spaced sufficiently apart in frequency that their third order intermodulation products do not overlap with the channel frequency bands within a given amplifier. Each frequency plan includes 32 channels, with 16 channels having one polarization (say vertical or right hand circular), and the other 16 channels occupying the same frequency bands but having the opposite polarization (horizontal or left hand circular) so that they do not interfere with the first 16 channels. In combining channels for amplification, it is not necessary that only one combination be made. Rather, multiple combinations can be established, with each channel combination amplified by a single respective common amplifier.

Figures 3A, 3B, 3C:
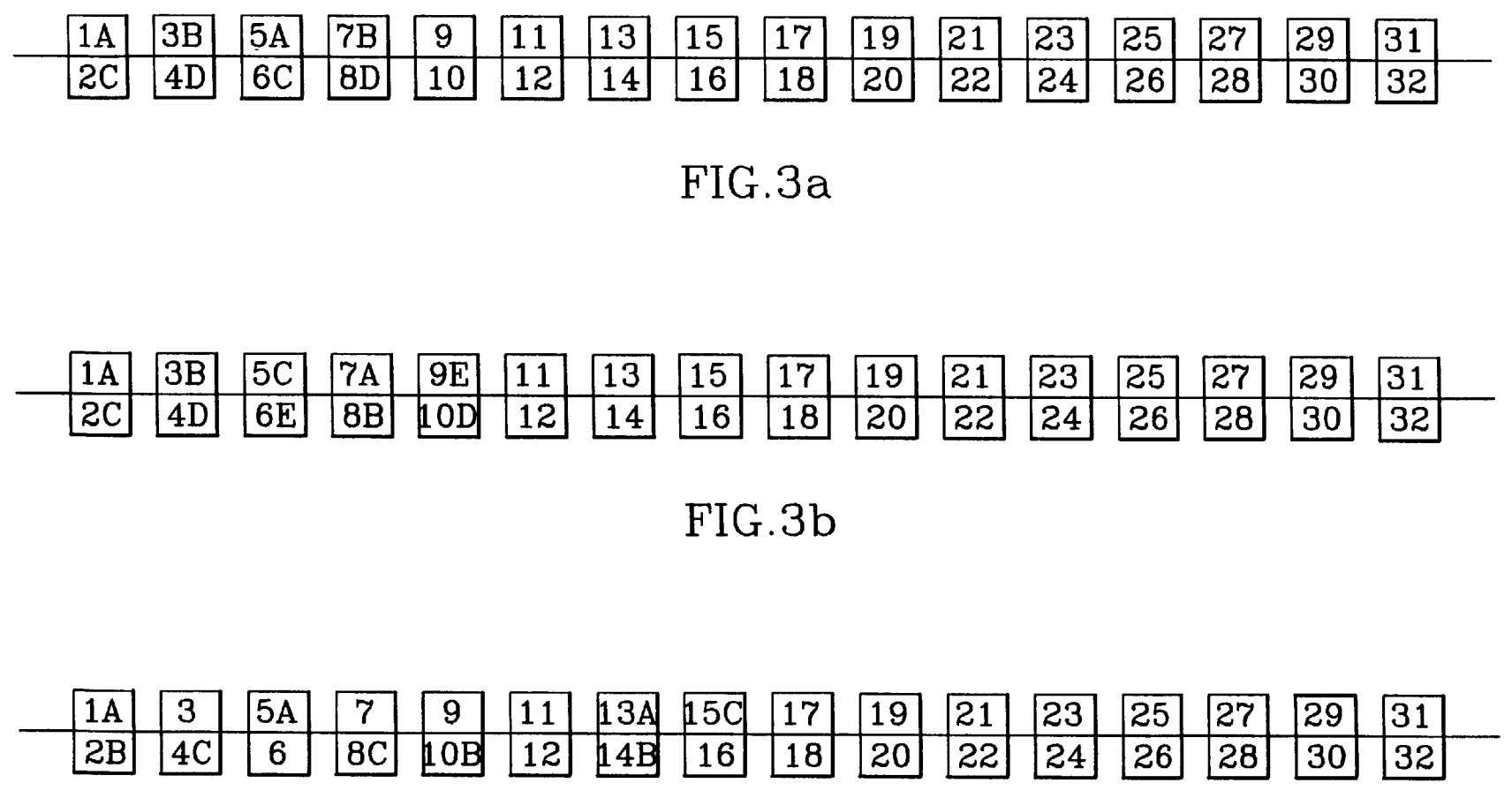

In FIGS. 3a–3f the channels to be amplified in common with each other are designated by the same letter. Thus, in FIG. 3a channels 1 and 5 are marked A to signify that they can be amplified together (this is the example of FIG. 2b). In a similar fashion, channels 3 and 7, 2 and 6, and 4 and 8 are respectively marked B, C and D to signify that they can also be combined for common amplifications. FIG. 3b illustrates other two-channel combinations, such as more widely spaced channels 1 and 7 or 4 and 10, or channels with opposite polarizations such as 3 and 8, 2 and 5, or 6 and 9.

Figures 3D, 3E, 3F:
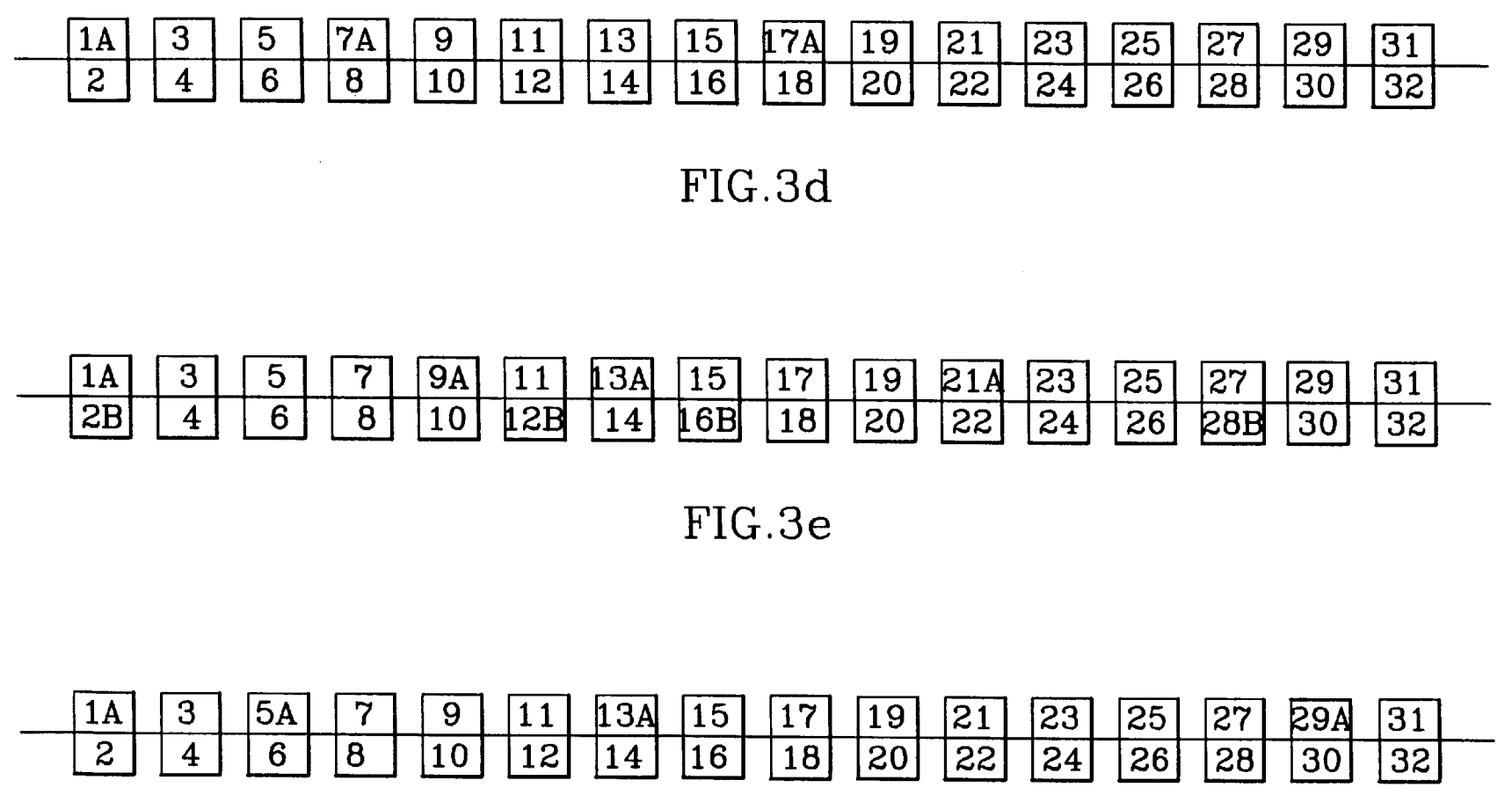

The number of channels that can be combined for common amplification is not limited to two. A greater number of channels can be combined, as long as the third order intermodulation products produced by any two of the channels do not overlap in frequency with any of the channels in the set. Various three-channel combinations are illustrated in FIG. 3c, including channels 1, 5 and 13, channels 2, 10 and 14, and channels 4, 8 and 15. FIG. 3d illustrates a greater channel separation, with channels 1, 7 and 17 selected as the set for common amplification.

With the frequency plan of 32 channels divided into 16 frequency bands used herein for purposes of illustration, up to four different channels can be amplified in common. This is illustrated by FIG. 3e, which shows channel combinations 1, 9, 13, 21 and 2, 12, 16, 28, and FIG. 3f which shows channel combination 1, 5, 13, 29. A common amplification of more than four different channels would require a larger total number of channel frequency bands.

A non-exhaustive listing of some of these combinations, plus other channel combinations that can be used for common amplification, is set forth below in Table 1, in which N is the number of channels being combined:

TABLE 1

| N = 2 |
|---|
| 1 and 5 |
| 3 and 7 |
| 1 and 7 |

TABLE 1-continued 1 and 31
etc.
N = 3

1, 5 and 13
1, 5 and 14
1, 9 and 13
1, 7 and 17
etc.
N = 4

1, 9, 13 and 21
1, 11, 17 and 27
1, 5, 13 and 29
etc.

Figure 4:
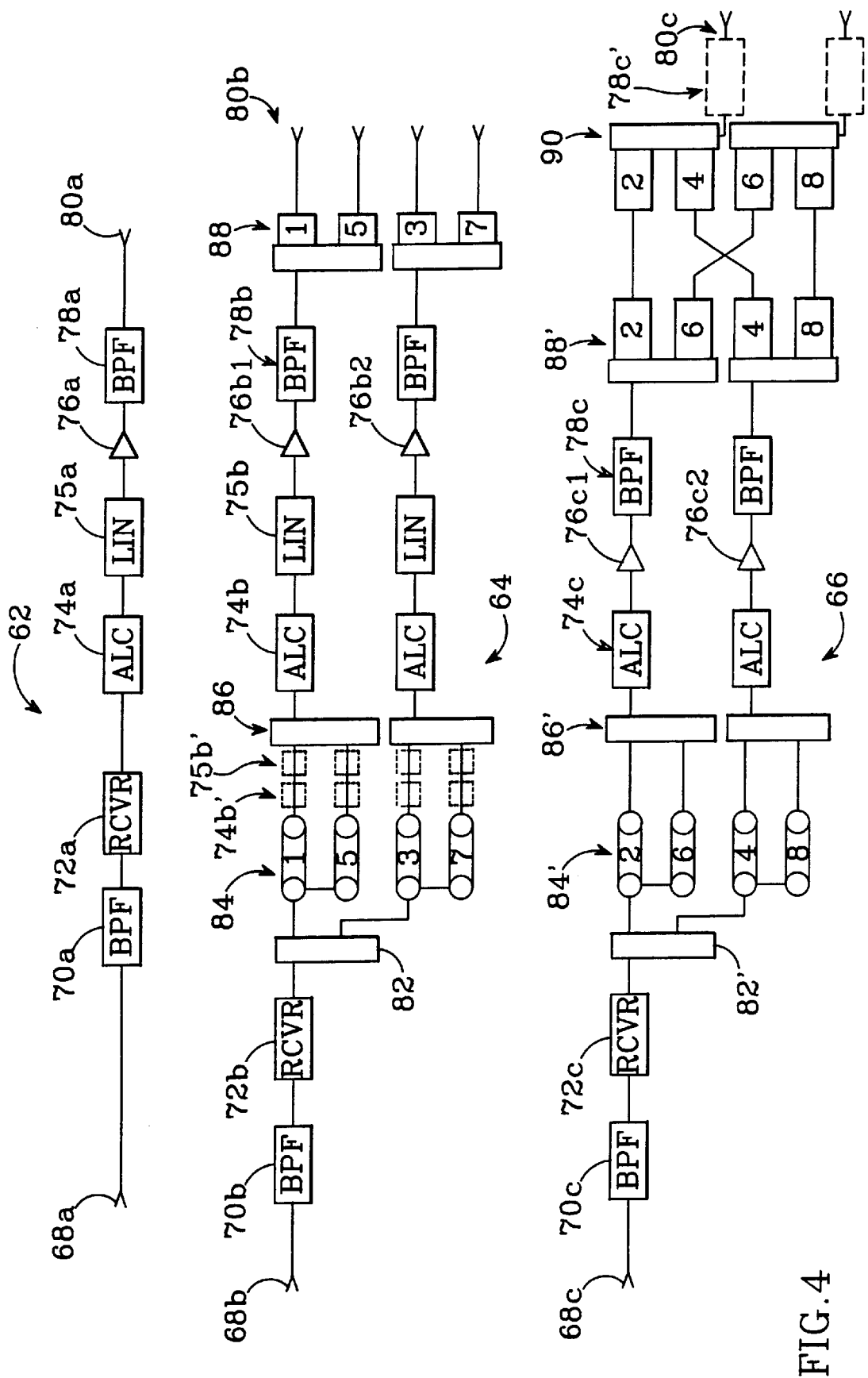
FIG. 4 is a block diagram of a satellite transponder system that employs the invention.

FIG. 4 is a simplified block diagram of on-board satellite circuitry that can be used to implement the invention. Three circuits are shown. The first (62) is for processing a single channel, the second (64) is for processing multiple channels with common amplifiers and transmitting the different channels from individual downlink antennas, and a third circuit (66) which combines different channels for both amplification and downlink transmission, but in different combinations.

The first circuit 62 receives an uplink signal via uplink antenna 68a and processes it in a bandpass filter rejects signals outside that band, including the downlink transmission frequencies. The filtered input signal is then processed through a receiver 72a, which includes a broadband low noise amplifier and a frequency converter that converts the signal from its uplink to its downlink frequency band. After the receiver, the channel signal at its downlink frequency band is processed by a conventional pre-amplification channel control unit with automatic level control (ALC) 74a and/or a linearizer 75a, and then by a high power amplifier 76a that is generally implemented as either a traveling wave tube or a solid state power amplifier. The amplified signal is filtered by a broadband bandpass filter 78a which rejects the uplink frequency to prevent energy from getting back into the receiver, and is then transmitted to earth as a broadcast beam from downlink antenna 80a.

In circuit 64, separate channels are combined for high power amplification. The uplink channel signals are received by an uplink antenna 68b, with downlink frequencies removed by bandpass filter 70b and low noise amplification with conversion to downlink frequency performed by receiver 72b.

In this example it is assumed that channels 1, 3, 5 and 7 are all received by antenna 68b. These channels are separated from each other by a hybrid divider 82 and a set of input filters 84 which divide the input signal into its separate channels. Channels 1 and 5 are then combined with each other, as are channels 3 and 7. Because signal loss is not a particular concern at the low power levels involved at this point, the signal combining can be accomplished by simple hybrid combiners 86. The combined channel signals are then pre-amplified, preferably automatic level controlled by ALCs 74b and/or linearized by linearizers 75b for instances in which the uplink signals originate from a common ground station. However, if the uplink signals originate from different ground locations, a separate ALC 74b' and/or linearizer 75b' is preferably inserted into each individual channel path prior to the hybrid combiners 86, as indicated in dashed lines.

The combined channels 1 and 5 are now amplified by high power amplifier 76b1, while the combined channels 3 and 7 are amplified by high power amplifier 76b2. These amplifiers are preferably selected to have somewhat higher power ratings than the combined powers of their respective channels to avoid saturation and operate more efficiently, but are not so large as to add unnecessary surplus capacity.

After filtering by downlink broadband bandpass filters 78b, the combined channel signals are again separated into individual channels, preferably by microwave output channel filters 88 connected to perform a demultiplex 88 formation which incorporate channel bandpass filters. This generates discrete channel outputs while at the same time providing an additional refection of unwanted intermodulation products generated in the amplifiers 76b. Each individual channel downlink signal is then transmitted by a respective downlink antenna 80b.

The circuit 66 which combines channels 2, 6 and 4, 8 for common amplification is essentially similar to circuit 64 for channels 1, 3, 5 and 7 up to the point of downlink transmission, and similar reference numbers are used for circuit 66 as for circuit 64, with the "b" reference number modifier changed to "c" and a prime added to reference numbers that are used only for circuit 64 and not circuit 62. For circuit 66, however, rather than transmitting each channel from a separate downlink antenna, the separate channel signals are combined with one or more channels in microwave combining filters 90, known as output multiplexers, whose outputs are then routed to respective downlink antennas 80c. In this case the output bandpass filters could be located after the combining filters 90, as indicated in dashed lines by blocks 78c'. The relative usable output power level of each individual carrier is controlled by the ALC output set points when the input channel signals are received from different uplink sites. When a single common uplink site is used to originate the different channel signals, the relative output power level of each individual carrier is controlled by the relative uplink power in each channel from that common site. The relative input power levels required are not the same as the resulting output power levels for unbalanced outputs, due to the non-linear characteristics of the high power amplifiers. As an option for applications that require better linearity and intermodulation performance, a linearizer can be added before the high power amplifiers. This function can be included with or without the ALC function.

Standard high power amplifier sizes generally range from 50 w to 150 w, whereas the beam powers required for direct television satellite broadcasts are generally in the range of about 17 w–130 w. A standard amplifier can thus be used to amplify two or more lower power beams in common. Although this reduces the effective amplify capacity of nonlinear amplifiers by about 1.5 db, the reslting cost savings more than compensate for the power loss.

By applying the invention to the illustrative 32 channel frequency plan, a system can be realized with only 10 high power amplifiers, as opposed to the 32 individual (smaller power) amplifiers that would have been required previously. The realizable cost savings in this case is approximately proportional to the number of amplifiers required, resulting in a reduction in cost (and mass) of approximately 70%. The attainability of such a savings will depend upon the power requirements of the individual channels. Even if the channels are combined only in pairs (N=2), the result will be 16 high power amplifiers, for a savings of approximately 50%.

While particular embodiments of the invention have been shown and described, numerous variations and alternate embodiments will occur to those skilled in the art. Accordingly, it is intended that the invention be limited only in terms of the appended claims.

I claim:

1. A method of amplifying signals for spacecraft broadcast from a plurality of input signals within different respective frequency bands, comprising:
    selecting a first set of said input signals whose frequency bands are mutually discrete and sufficiently separated in frequency that their third order intermodulation products do not substantially overlap in frequency with any of the other input signals in said first set, and
    amplifying the selected set of signals with a first common amplifier.

2. The method of claim 1, wherein said selected set of signals are combined prior to amplification, and the combined signal is amplified by said common amplifier.

3. The method of claim 2, further comprising the step of separating the selected set of signals from each other after amplification.

4. The method of claim 3, further comprising the steps of:
    selecting at least one additional set of said input signals whose frequency bands are mutually discrete and sufficiently separate in frequency that their third order intermodulation products do not substantially overlap in frequency with any of the other input signals in the same set,
    amplifying each additional set of signals with a respective common amplifier different from said first common amplifier, and
    separating the signals within each additional set from each other after amplification.

5. The method of claim 4, further comprising the step of combining at least some of said separated and amplified signals.

6. The method of claim 5, wherein the combined amplified signals are combined in sets different from said sets of input signals.

7. The method of claim 4, wherein each input signal is included in no more than one of said input signal sets.

8. The method of claim 4, wherein said first set of signals have a common polarization, and at least one of said additional set of signals have a polarization opposite to said first set.

9. The method of claim 8, wherein said first and opposite polarization sets of signals have common frequency bands.

10. The method of claim 3, further comprising the step of broadcasting said separated and amplified signals from a satellite.

11. The method of claim 10, further comprising the step of combining at least some of said separated and amplified signals prior to broadcast from said satellite.

12. The method of claim 10, further comprising the step of transmitting said input signals to said satellite from a ground station.

13. The method of claim 2, wherein said first set of input signals are linearized prior to amplification.

14. The method of claim 2, wherein said first set of input signals are automatic level controlled prior to amplification.

15. The method of claim 14, wherein said first set of input signals are linearized after being automatic level controlled but prior to amplification.

16. The method of claim 14, wherein said first set of input signals are automatic level controlled prior to being combined with each other.

17. The method of claim 14, wherein said first set of input signals are automatic level controlled after being combined with each other.

18. The method of claim 2, wherein said amplifier has a rated power capacity greater than the sum of the signal powers for said first set of signals after amplification.

19. The method of claim 2, further comprising the step of amplifying at least one other of said input signals with a separate respective amplifier.

20. A spacecraft communications signal amplification system for amplifying signals from a plurality of input communication signals within different respective frequency bands, comprising:
    a signal combiner connected to combine a first set of said input signals whose frequency bands are mutually discrete and sufficiently separated that their third order intermodulation products do not substantially overlap in frequency with any of the other signals in said first set, and
    a first common amplifier connected to amplify the combined first set of input signals.

21. The signal amplification system of claim 20, further comprising a signal separator connected to separate said first set of signals from each other after amplification by said common amplifier.

22. The signal amplification system of claim 21, further comprising:
    at least one additional signal combiner connected to combine at least one additional set of said input signals whose frequency bands are mutually discrete and sufficiently separate in frequency that their third order intermodulation products do not substantially overlap in frequency with any of the other input signals in the same set,
    a respective additional common amplifier for each of said additional signal sets, connected to amplify the combined signal from its respective additional signal combiner, and
    a respective additional signal separator for each of said additional signal sets connected to separate the signals within its respective set from each other after amplification.

23. The signal amplification system of claim 22, further comprising at least one output signal combiner connected to combine at least some of said separated and amplified signals.

24. The signal amplification system of claim 23, at least some of said output signal combiners connected to combine their respective separated and amplified signals into sets different from said sets of input signals.

25. The signal amplification system of claim 22, wherein said signal combiners are connected so that no input signal is connected to more than one of said signal combiners.

26. The signal amplification system of claim 22, wherein at least one of said signal combiners is connected to combine a respective set of input signals having a common first polarization, and at least one other of said signal combiners is connected to combine a respective set of opposite polarity input signals.

27. The signal amplification system of claim 26, wherein at least one signal combiner for said first polarization input signals and at least one signal combiner for said opposite polarization input signals are connected to combine respective sets of input signals having common frequency bands.

28. The signal amplification system of claim 21, further comprising at least one output signal combiner connected to combine at least some of said separated and amplified signals.

29. The signal amplification system of claim 20, further comprising at least one additional amplifier connected to amplify a single respective one of said input signals uncombined with any other input signal.

30. The signal amplification system of claim 20, further comprising linearizers connected to linearize the input signals in said first set prior to amplification.

31. The signal amplification system of claim 20, further comprising automatic level controllers connected to control the levels of the input signals in said first set prior to amplification by said common amplifier.

32. The signal amplification system of claim 31, further comprising linearizers connected to linearize the input signals in said first set after said automatic level controllers but prior to amplification.

33. A communications satellite, comprising:
a satellite body,
an uplink antenna system on said satellite body for receiving a multi-channel uplink signal,
a plurality of channel filters connected to separate a signal received by said uplink antenna system into a plurality of channel signals with mutually discrete frequency bands,
a signal combiner connected to combine a first set of said channel signals whose frequency bands are sufficiently separated in frequency that their third order intermodulation products do not substantially overlap in frequency with any of the other channel signals in said first set,
a first common amplifier connected to amplify the combined signal, and
a downlink antenna system connected to transmit said first set of channel signals after amplification by said common amplifier.

34. The communications satellite of claim 33, further comprising a signal separator connected to separate said first set of channel signals from each other after amplification by said common amplifier and prior to transmission by said downlink antenna system.

35. The communications satellite of claim 34, further comprising:
at least one additional signal combiner connected to combine at least one additional set of channel signals, each additional set consisting of at least two of said channel signals whose frequency bands are sufficiently separate in frequency that their third order intermodulation products do not substantially overlap in frequency with any of the other channel signals in the same set,
a respective additional common amplifier for each of said additional channel signal sets, connected to amplify the combined signal from its respective additional signal combiner, and
a respective additional signal separator for each of said additional signal sets connected to separate the channel signals in its respective set from each other after amplification,
said downlink antenna system connected to transmit each of said additional sets of channel signals after amplification and signal separation.

36. The communications satellite of claim 35, further comprising at least one output signal combiner connected to combine at least some of said separated and amplified channel signals prior to transmission by said downlink antenna system.

37. The communications satellite of claim 36, at least one of said output signal combiners connected to combine its respective separated and amplified signals into a set different from said channel signal sets prior to amplification.

38. The communications satellite of claim 35, wherein said signal combiners are connected so that no channel signal is connected to more than one of said signal combiners.

39. The communications satellite of claim 35, wherein at least one of said signal combiners is connected to combine a respective set of channel signals having a common first polarization, and at least one other of said signal combiners is connected to combine a respective set of opposite polarity channel signals.

40. The communications satellite of claim 39, wherein at least one signal combiner for said first polarization channel signals and at least one signal combiner for said opposite polarization channel signals are connected to combine respective sets of channel signals having common frequency bands.

41. The communications satellite of claim 34, further comprising at least one output signal combiner connected to combine at least some of said separated and amplified channel signals prior to transmission by said downlink antenna system.

42. The communications satellite of claim 33, further comprising automatic level controllers connected to control the level of said channel signal set prior to amplification by said common amplifier.

43. The communications satellite of claim 33, further comprising frequency converters for converting the frequencies of said channel signals from uplink to downlink frequencies.

44. The communications satellite of claim 43, wherein said frequency converters are connected between said channel filters and said signal combiner.

45. The communications satellite of claim 33, wherein said downlink antenna system is configured to broadcast signals at broadcast satellite service (BSS) and fixed satellite service (FSS) frequencies.

46. The communications satellite of claim 33, further comprising at least one additional amplifier connected to amplify a single respective one of said channel signals uncombined with any other channel signal for transmission by said downlink antenna system.

* * * * *